(12) United States Patent
Feldmeier

(10) Patent No.: US 8,919,619 B2
(45) Date of Patent: Dec. 30, 2014

(54) FLOOR APPLICATION SYSTEM

(71) Applicant: Fas-Trak Industries, Monee, IL (US)

(72) Inventor: Mark Scott Feldmeier, Peotone, IL (US)

(73) Assignee: Fas-Trak Industries, Monee, IL (US)

( * ) Notice: Subject to any disclaimer, the term of this patent is extended or adjusted under 35 U.S.C. 154(b) by 77 days.

(21) Appl. No.: 13/677,500

(22) Filed: Nov. 15, 2012

(65) Prior Publication Data

US 2013/0126562 A1     May 23, 2013

Related U.S. Application Data

(60) Provisional application No. 61/562,163, filed on Nov. 21, 2011.

(51) Int. Cl.
| | |
|---|---|
| *B60P 3/22* | (2006.01) |
| *B67D 3/00* | (2006.01) |
| *A47L 13/50* | (2006.01) |
| *A47L 13/51* | (2006.01) |
| *B62B 3/02* | (2006.01) |
| *B62B 3/10* | (2006.01) |

(52) U.S. Cl.
CPC ............... *B67D 3/0083* (2013.01); *A47L 13/50* (2013.01); *A47L 13/51* (2013.01); *B62B 3/02* (2013.01); *B62B 3/10* (2013.01); *B62B 2202/028* (2013.01); *B62B 2202/50* (2013.01)
USPC ...... 222/608; 222/105; 222/181.1; 222/185.1; 222/505

(58) Field of Classification Search
CPC ......... A47L 13/10; A47L 13/58; B05B 9/007; B67D 1/06; B67D 7/845; B65D 77/065; B65D 77/067; B65D 83/0055
USPC ............. 222/1, 105, 183, 175, 608, 610, 614, 222/185.1, 181.1, 472–474, 505
See application file for complete search history.

(56) References Cited

U.S. PATENT DOCUMENTS

| | | | | |
|---|---|---|---|---|
| 1,818,916 | A | * | 8/1931 | Wasen .............................. 401/48 |
| 4,630,965 | A | * | 12/1986 | Nguyen et al. ................ 404/107 |
| 5,735,952 | A | * | 4/1998 | Wilson, Sr. .................... 118/100 |
| 6,017,163 | A | * | 1/2000 | Keppers et al. .................. 401/48 |
| 7,389,563 | B2 | * | 6/2008 | Martinez et al. ............. 15/327.1 |
| 7,437,795 | B1 | * | 10/2008 | Bez .................................. 15/261 |
| 7,703,166 | B2 | * | 4/2010 | Raddick ............................ 15/98 |
| 7,823,757 | B1 | * | 11/2010 | Vinson et al. ................. 222/608 |
| 7,850,383 | B2 | * | 12/2010 | Bober et al. ................... 401/137 |
| 7,878,378 | B1 | | 2/2011 | Robinson |
| 8,246,263 | B2 | * | 8/2012 | Bober et al. ..................... 401/48 |
| 8,608,395 | B2 | * | 12/2013 | Bober et al. ..................... 401/48 |

* cited by examiner

*Primary Examiner* — Frederick C Nicolas
(74) *Attorney, Agent, or Firm* — Bishop Diehl & Lee, Ltd.

(57) ABSTRACT

A portable liquid applicator system and a method for applying liquid directly from an original package container, e.g., a five-gallon bucket, to a surface. The system includes a wheeled platform onto which the container is positioned such that fluid within the container flows toward a pour opening. A extended actuating handle engages a valve at the pour opening and allows the valve to be opened and closed by a user in an upright position, rather than having to bend to operate the valve. A method includes positioning the container on the platform, opening the valve, and then moving the platform to disperse the liquid onto a surface.

9 Claims, 7 Drawing Sheets

FLOOR APPLICATION SYSTEM

RELATED APPLICATION

The present application claims the 35 U.S.C. 119(b) filing priority of U.S. Provisional Application No. 61/562,163 titled "Stingray 5 Gallon Application System" and filed on Nov. 21, 2011. The disclosure of the '163 application is hereby incorporated by reference.

TECHNICAL FIELD OF THE INVENTION

The present invention relates to a floor-maintenance system. More specifically, the invention relates to a system which facilitates floor maintenance, such as washing and waxing, as well as tool storage.

BACKGROUND OF THE INVENTION

The job of maintaining and cleaning commercial, industrial, institutional and public buildings is a difficult and demanding task in the best of circumstances. Where floors or other hard surfaces are concerned, particularly high-traffic areas, the job seems never-ending. It is both time-consuming and physically-intensive in many cases. Where multiple solutions are needed to clean, strip, wash, wax and seal a surface, an individual may have to fill and clean a dispensing bucket numerous times. The necessary solutions for these chores are typically premixed and sold in original large bulk containers, such as five gallon buckets or five gallon bag-in-a-box (BIB) containers, each weighing more than 50 lbs.

Workers are required to lift the heavy solution containers to a height of about three feet and pour the contents into a different wheeled-bucket, such as shown in U.S. Pat. No. 7,878,378 to Robinson. Where a very large surface (e.g., a school gymnasium) needs to be cleaned, stripped, sealed, and waxed, an individual would have to go through the steps of lifting, pouring, applying, refilling and cleaning out the wheeled-bucket several times over a period of time. In addition to the considerable time lost to cleaning and refilling the bucket, this strenuous activity can easily lead to work injury as well.

Further, there are environmental problems caused by the prior art system and processes. Many cleaning solutions contain volatile organic compounds (VOCs), which are characterized as having a high vapor pressure and a low water solubility. Once a solution of this kind is poured into a secondary container, such as shown in the '378 Robinson patent, it cannot be returned to the original container without contamination. It is very likely that, while not a promoted practice in the industry, the leftover solution is either poured down a sink drain or dumped outside where it can easily travel to areas and become a poison to greenery, as well as to animals and human water supplies. Even if properly disposed of, residual solution which must be cleaned from the secondary container may still have significant short and long term environmental impacts.

Until the invention of the present application, these and other problems in the prior art went either unnoticed or unsolved by those skilled in relevant art. The present invention provides a unique solution which will (1) save considerable time, (2) help prevent injury of workers due to fatigue, and (3) significantly reduce negative environmental impact caused by disposal of cleaning solutions, all without sacrificing simplicity features, design, style or affordability.

SUMMARY OF THE INVENTION

There is disclosed herein an improved liquid applicator system and method which avoid the disadvantages of prior devices, systems and methods while affording additional structural and operating advantages.

Generally speaking, the liquid applicator system comprises a platform for supporting a removable container in a position to allow dispensing of fluid from a pour opening, a valve operably secured within the pour opening of the container, and an extended actuating handle mechanically engaged with the valve. The invention eliminates the need to pour the contents of the original container into a secondary container for use.

In a specific embodiment, the platform is wheeled and includes a handle to allow a user to easily move the platform about a surface as liquid is being dispensed from the container. Further, a tool trough may also be provided on the platform to allow ready storage of a particular tool (e.g., a squeegee or mop) before, during and after liquid dispensing. In a method for applying a liquid to a surface directly from the original packaged container having a valve, the steps include positioning the original container on a wheeled platform, engaging the valve of the container with an extended actuating handle, operating the actuating handle to transition the valve to the open state, dispensing liquid from the container, moving the wheeled platform about to disperse the liquid across a surface, and then operating the actuating handle to transition the valve to the closed state.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
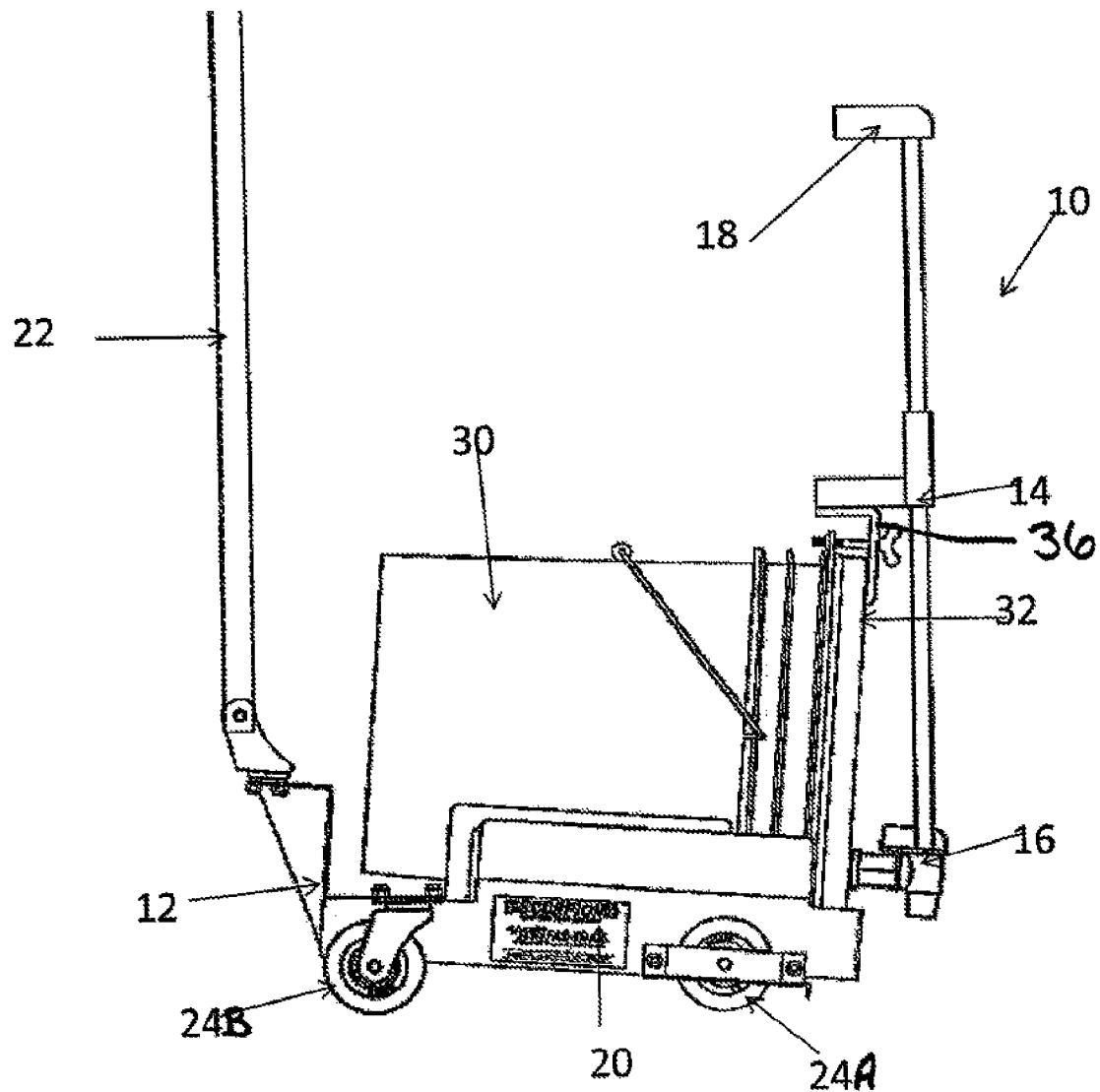
FIG. 1 is a side view of an embodiment of the present invention using a five-gallon bucket container.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Figure 4:
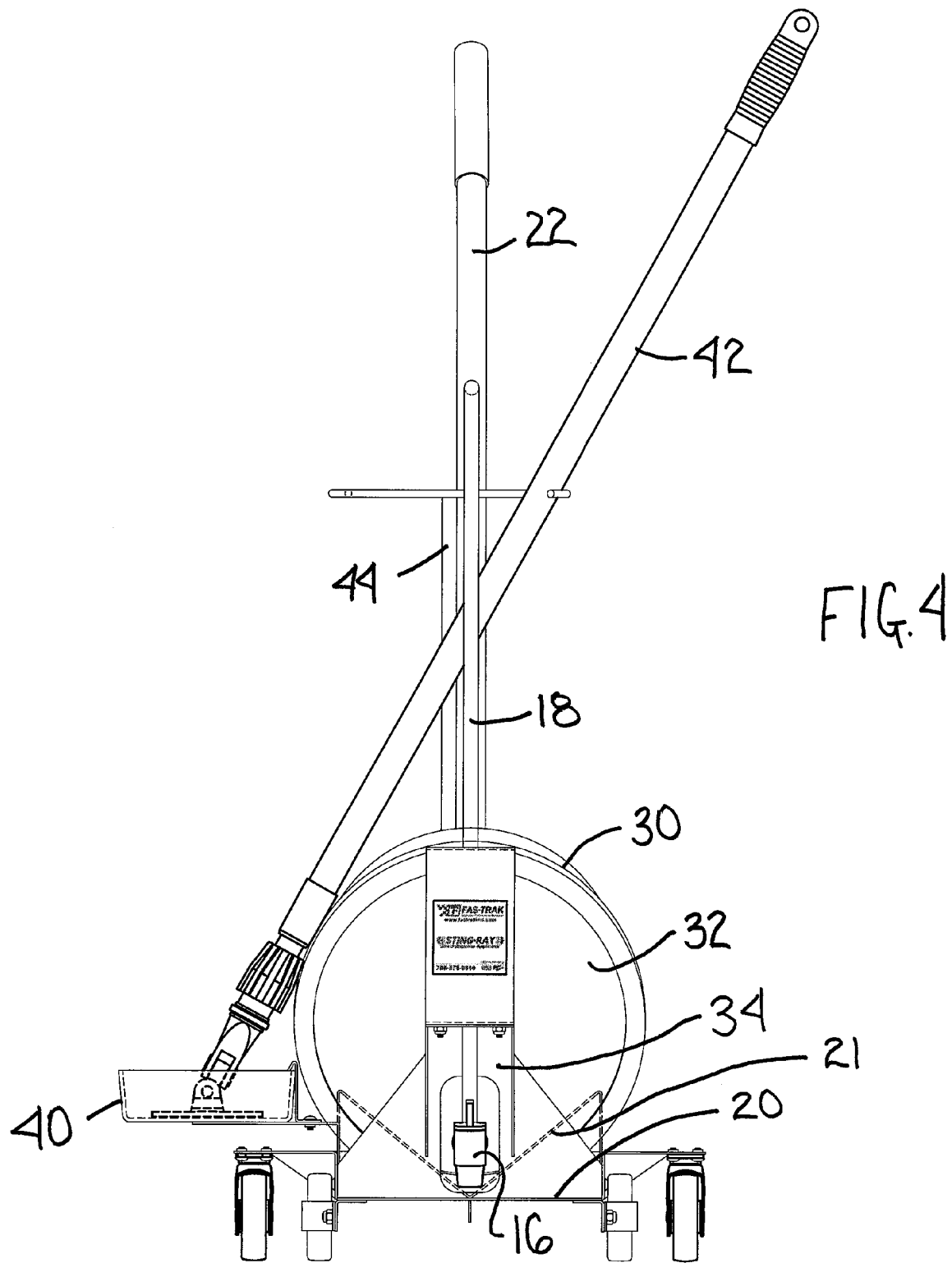
FIG. 4 is a front view of the embodiment of FIG. 3.
Figure 5:
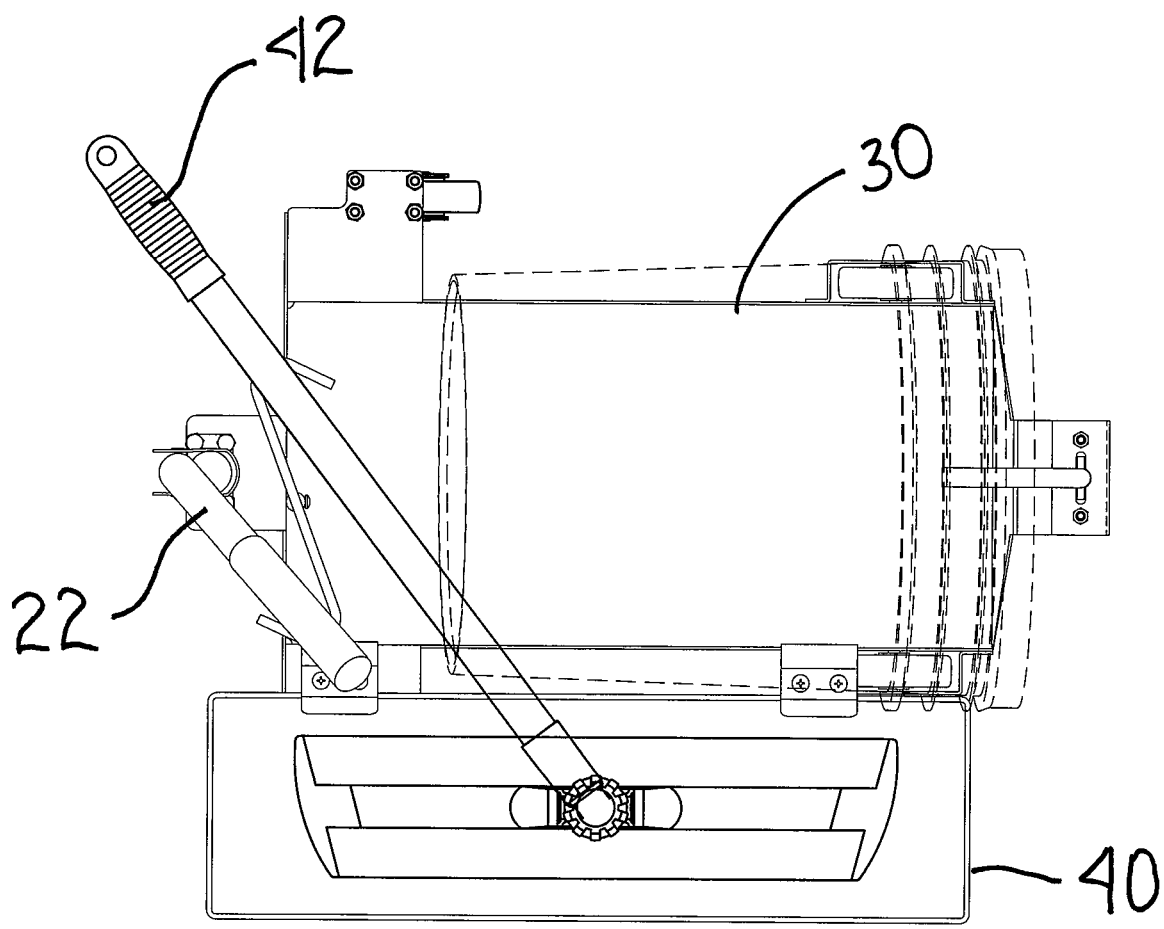
FIG. 5 is a top view of the embodiment of FIG. 3.
Figure 6:
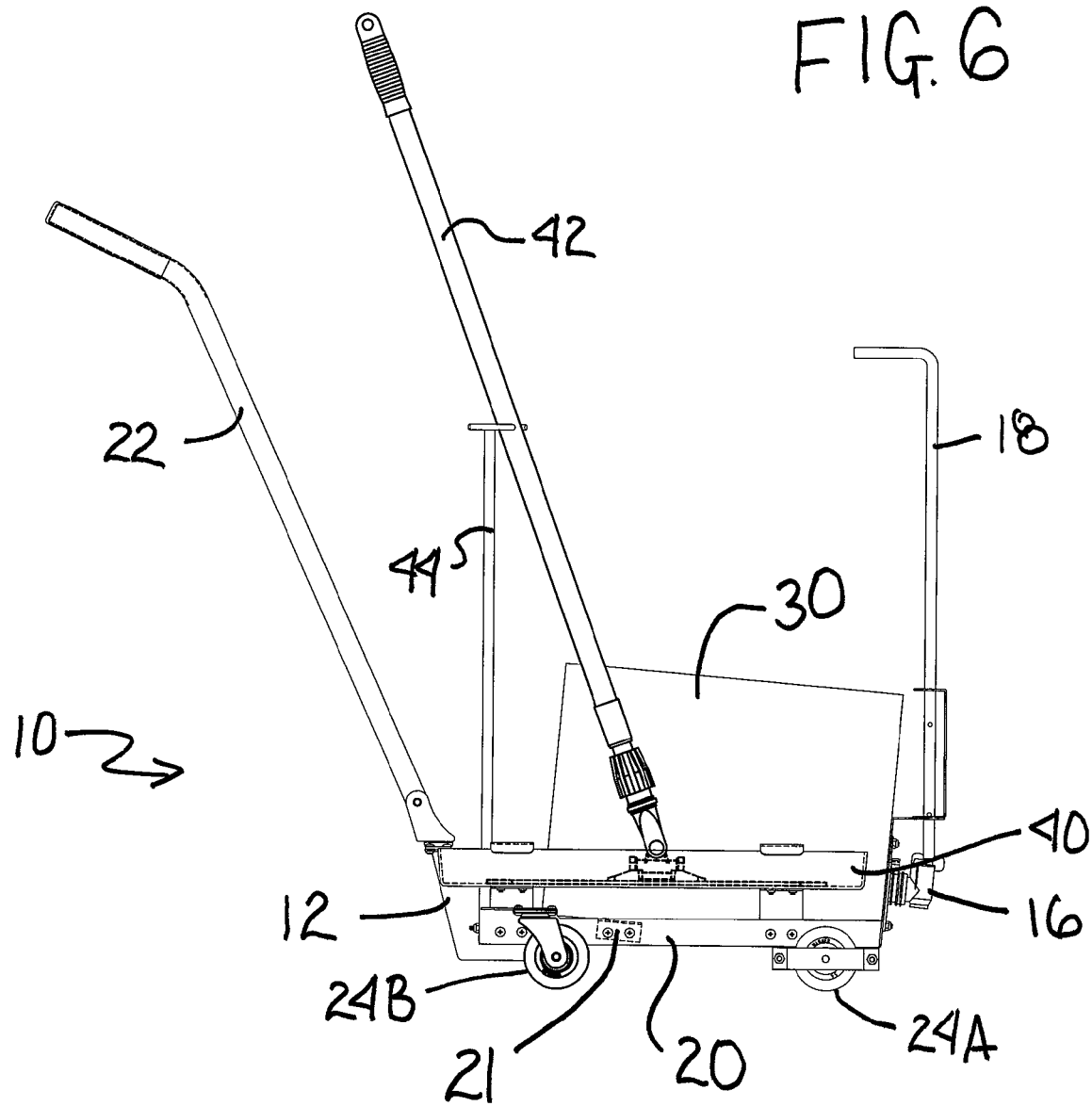
FIG. 6 is a side view of another embodiment of the present invention using a five-gallon bag-in-box (BIB) container.
Figure 7:
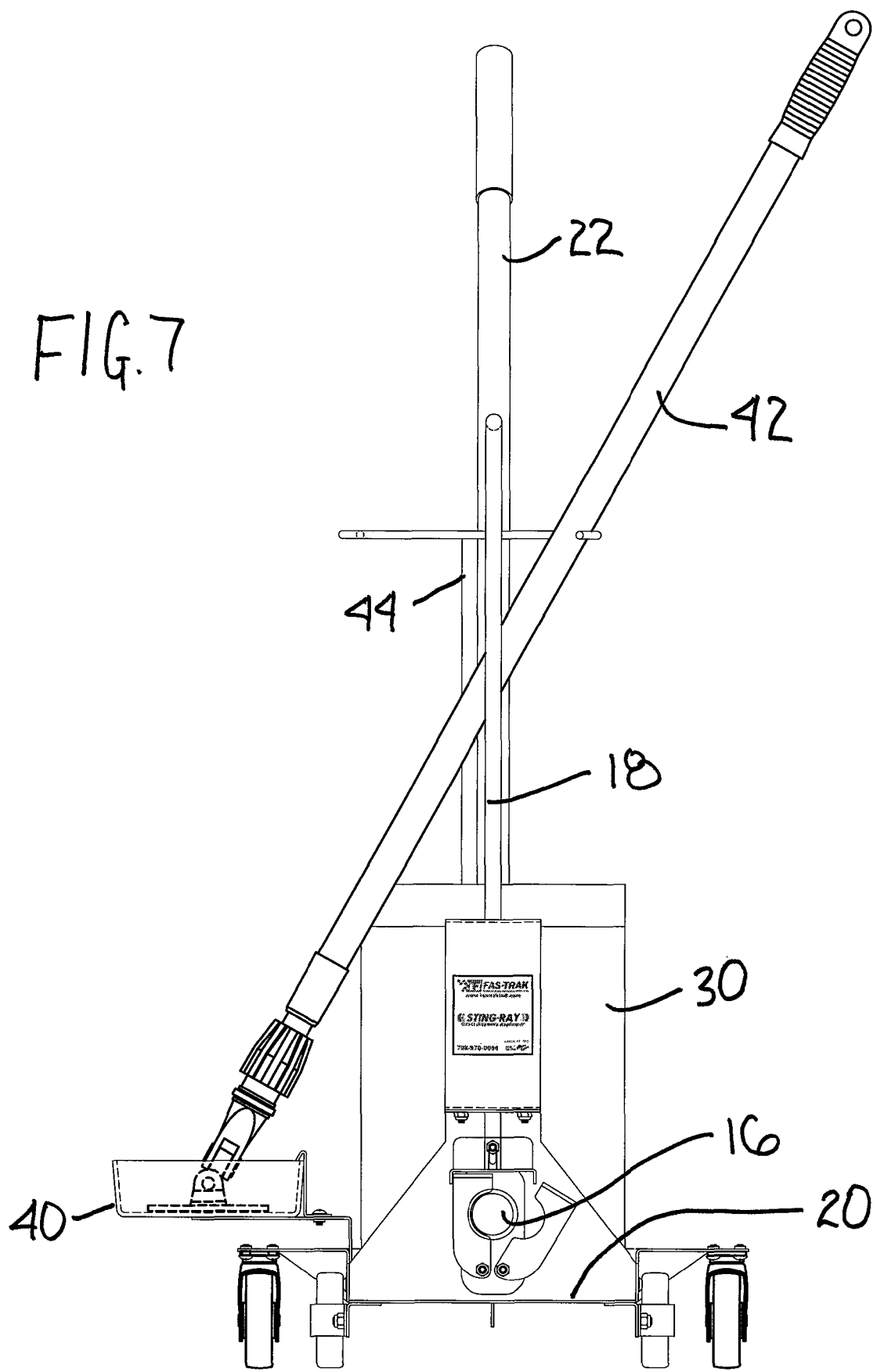
FIG. 7 is a front view of the embodiment of FIG. 6.

Referring to FIGS. 1-7, there is illustrated embodiments of a portable solution applicator system, generally designated by the numeral 10. The particular illustrated applicator system 10 is for a use with an original package container, for example, a five-gallon bucket of solution (FIGS. 1-5) or a five-gallon BIB container (FIGS. 6 and 7). In fact, while all the embodiments illustrated are directed to use with a solution contained in a five-gallon bucket or BIB, it should be understood that the principles of the invention can be more broadly applied and would include use with solutions packaged in an original container of most any configuration, as long as a pour opening can be provided, as will be explained in greater detail below.

A significant distinguishing advantage of the present invention over prior art is the elimination of having to transfer solution from a primary container to a secondary container. Associated with such an advantage includes (1) a time savings by not having to frequently stop working to transfer solution to, or clean the secondary container between uses; (2) a labor savings by not requiring repeated lifting and pouring by a user of a bulk solution into a relatively tall secondary container; and (3) an environmental impact savings by not creating left-over solution for disposal and not having residual solution to wash from a secondary container.

As can be seen in FIG. 1, the system 10 comprises a wheeled trolley 12 designed to receive and retain an original fluid container 30, such as the five gallon bucket (as shown) or a BIB (FIG. 6), as discussed above. The wheeled trolley 12 preferably includes a support platform 20, a retaining collar 34, four wheels 24 attached to the platform 20—e.g., two fixed wheels 24A and two pivotable wheels 24B—and a pivoting handle 22 to allow movement and control of the trolley 12 by a user.

The container 30 is preferably situated on the platform 20 of the trolley 12 in a pitched horizontal position to maintain flow toward lid 32 having suitable dispensing spout 16. The platform 20 is preferably low to the ground to minimize the lifting-height to position or displace the container 30. The platform 20 may also be shaped to best retain the container 30 in a stable position. In the illustrated embodiment of FIG. 2, a portion 21 of the platform 20 is rounded to hold the container 30.

The spout 16, which passes through a retaining collar 34 of the trolley 12 for stability, is pointed downward and may be integral to the container lid 32 or it may be a detachable feature added to the lid 32 by a user. A good seal at the spout 16 is important, as the container is positioned to be on its side and any leaks at the spout 16 could result in a loss of the fluid contents and an unexpected mess. As is known in the art, many such containers are typically equipped with a simple ball-cock valve spout or the like, while others have a pour opening which can be fitted with a spout.

Figure 2:
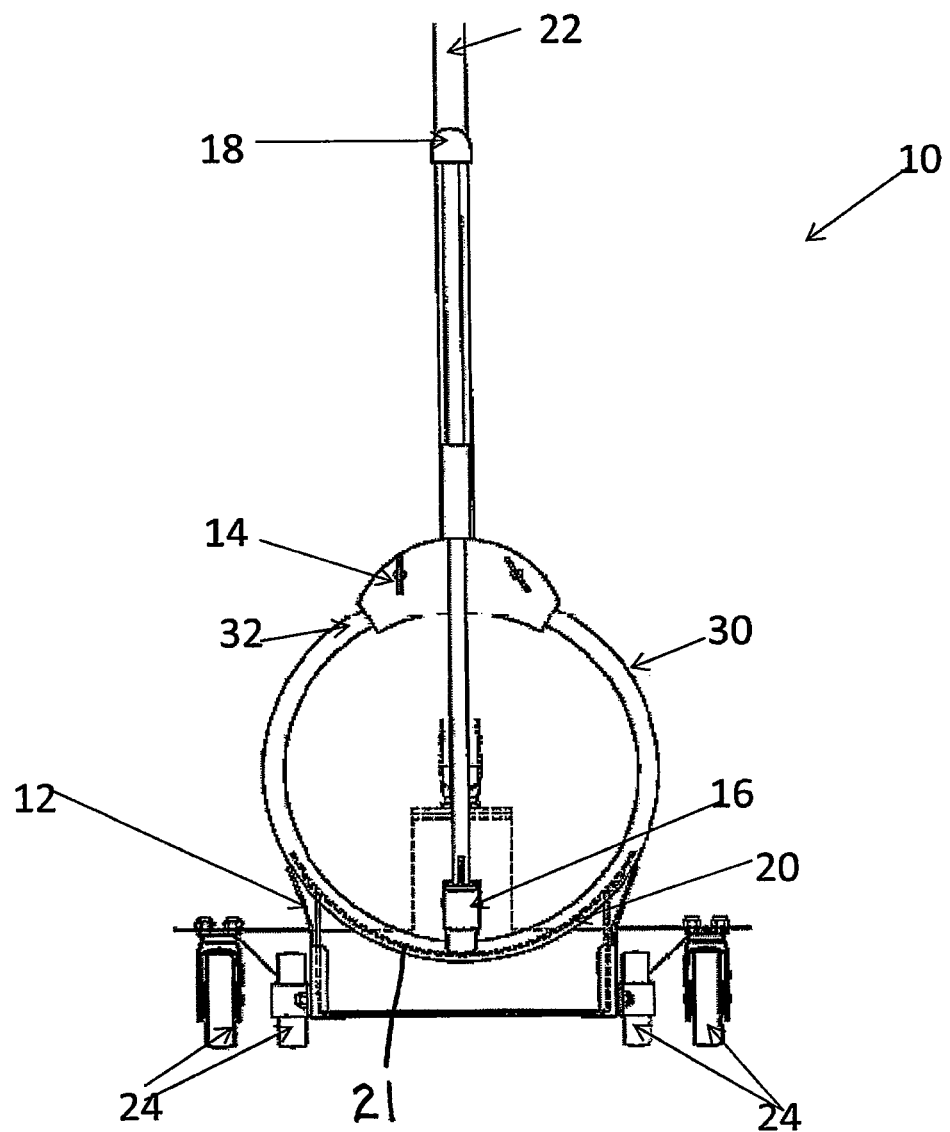
FIG. 2 is a front view of the embodiment of FIG. 1.

A harness assembly 14 may be used to secure the container 30 at the lid 32 just above or proximate to the spout 16. As shown in FIGS. 1 and 2, a fixed bracket 36 is used to connect to the lid 32 and is tightened by a pair of wing nuts and screws. Other or additional means may be used to secure the container 30 to the trolley 12 and provide stability, as necessary.

Control of the spout 16 is facilitated by an actuating handle 18. The handle 18 may be in contact with the harness assembly 14. The actuating handle 18 is preferably a long rod having a bifurcated section at one end and a grip at an opposite end. The bifurcated section engages the lever of the spout 16 such that rotational movement of the grip (or any part of the actuating handle 18) causes the bifurcated section to turn the lever of the spout 16. Naturally, turning the lever opens and closes the valve of the spout 16. Accordingly, the user need not bend over to open and close the valve each time. Instead, the spout 16 can be controlled from above to facilitate dispensing of liquid.

Figure 3:
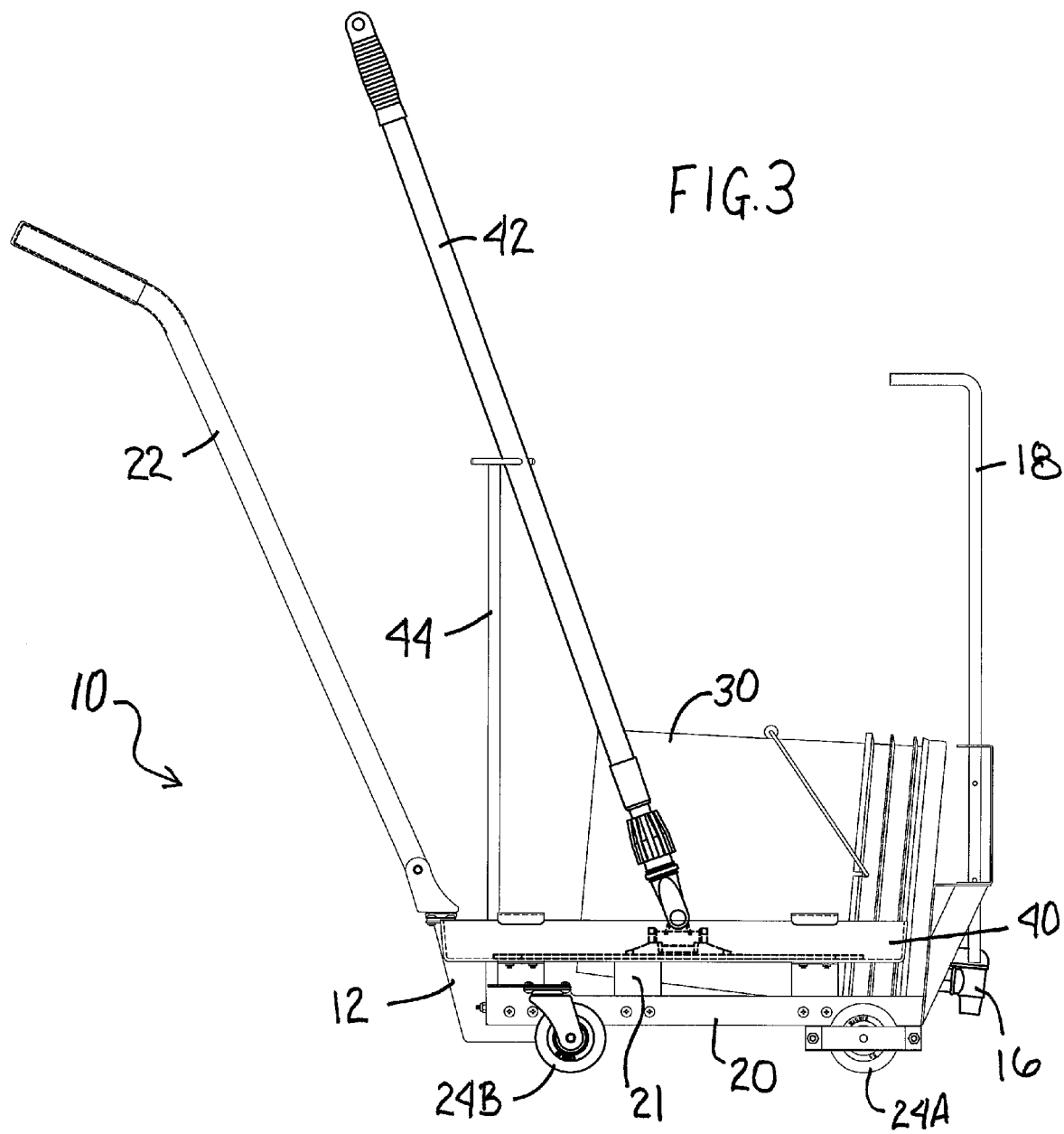
FIG. 3 is a side view of another embodiment of the present invention.

Referring now to FIGS. 3-5, a second embodiment of the applicator system 10 is illustrated. This embodiment is substantially identical to that of FIGS. 1-2, with the notable addition of a tool trough 40 attached to trolley 12. The trough 40 is intended to provide retention and storage of tool 42 such as a floor squeegee, mop or similar tool when not in use. The trough 40 has a depth which allows remnant liquid from the tool head to be retained as well. It is anticipated that the trough 40 may be detachable from the trolley 12 to allow cleaning, as necessary. As part of the tool retention feature of the present embodiment, a tool rest bar 44 is positioned on the trolley 12 proximate the handle 22. The tool rest bar 44 is preferably comprised of an S-shaped bar to allow support for both the system handle 22 and a tool handle, as shown.

Also, a portion 21 of the platform 20 of the trolley 12 is V-shaped to center a bucket container 30 placed thereon. The V-shaped portion 21 also maintains the container 30 in a forward sloped condition, as previously described. However, as with the previous embodiment, the platform 20 and/or the portion 21 can be constructed in alternate configurations to be contoured in a manner which best supports the shape of any other container 30. For example, where a square BIB is used, as shown in FIGS. 6 and 7, the portion 21 is a flat insert instead of the V-shape, and elevates the back of the BIB container.

In an exemplary use, a bulk container 30 is first opened to provide a pathway for contained liquid to be dispensed from the container. Preferably, a spout 16 having an internal open and closable valve is positioned within the opening to thereby seal the opening against leakage. With the valve closed, the container can then be placed on a side onto the trolley 12 with the spout 16 at the low end of the angled platform 20. The container 30 may be secured and stabilized in any number of ways to the trolley 12. To prevent the need for constant stooping to operate the valve of spout 16, an extended actuating handle 18 can be used to engage the valve. At this point, the valve may be opened by turning the actuating handle 18 and the trolley 12 pulled by handle 22 about a surface to distribute liquid from the container. Once sufficient liquid is dispensed, the actuating handle 18 may be turned to close the valve.

Once the operation is complete, the container 30 may be removed from the trolley 12 by reversing the step of installation set forth above. If the container 30 is empty, then it may be disposed of as required by law. However, if the container 30 is not empty, then it may be capped and stored for future use.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A liquid applicator system comprising:
   a removable container at least partially filled with a liquid and having an opening for dispensing liquid there from;
   a valve operably secured within the container opening and capable of transitioning between an open state and a closed state;
   a platform comprising an insert for supporting and retaining the removable container in a sloped position such that liquid within the container is dispensed through the valve when in the open state; and
   an actuating handle mechanically engaged with the valve to transition the valve between the open state and the closed state;
   wherein the actuating handle extends to allow remote transitioning.

2. The liquid applicator system of claim 1, wherein the platform comprises a set of wheels to facilitate movement of the system.

3. The liquid applicator system of claim 2, further comprising a steering handle attached to the platform to allow a user to move the system.

4. The liquid applicator system of claim 1, further comprising a tool trough detachably secured to the platform.

5. The liquid applicator system of claim 4, wherein the tool trough is substantially the same length as the platform.

6. The liquid applicator system of claim 1, wherein the container comprises a five gallon bucket.

7. The liquid applicator system of claim 1, wherein the container comprises a bag-in-a-box.

8. The liquid applicator system of claim 1, wherein the platform is sloped.

9. The liquid applicator system of claim 1, further comprising a spout to direct liquid flow from the container and wherein the valve is positioned within the spout.

* * * * *